United States Patent
Lim et al.

(10) Patent No.: US 7,552,441 B2
(45) Date of Patent: *Jun. 23, 2009

(54) SOCKET COMPATIBILITY LAYER FOR TOE

(75) Inventors: Eun-Ji Lim, Taejon (KR); Chei-Yol Kim, Taejon (KR); Sung Hoon Son, Seoul (KR); Sung-In Jung, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 666 days.

This patent is subject to a terminal disclaimer.

(21) Appl. No.: 11/002,623

(22) Filed: Dec. 3, 2004

(65) Prior Publication Data

US 2005/0135361 A1    Jun. 23, 2005

(30) Foreign Application Priority Data

Dec. 17, 2003    (KR) .................. 10-2003-0092523

(51) Int. Cl.
G06F 3/00 (2006.01)
G06F 9/44 (2006.01)
G06F 15/173 (2006.01)

(52) U.S. Cl. .................. 719/312; 719/328; 709/250
(58) Field of Classification Search .............. 709/250; 719/312, 328

See application file for complete search history.

(56) References Cited

U.S. PATENT DOCUMENTS 7,426,579 B2 * 9/2008 McDaniel .................. 709/250

(Continued)

FOREIGN PATENT DOCUMENTS

KR    10-2001-0084208    12/2003
KR    10-2003-95649    12/2003

OTHER PUBLICATIONS

Intel "Offload Sockets Framework and Socket Direct Protocol High Level Design" http://infiniband.sourceforge.net/archive/OSF_SDP_HLD.pdf.*
Fast Socket reference: http://www.cs.purdue.edu/homes/yau/cs690y/fastsocket.ps.*

(Continued)

*Primary Examiner*—Larry D Donaghue
*Assistant Examiner*—Karen C Tang
(74) *Attorney, Agent, or Firm*—Lowe Hauptman Ham & Berner, LLP

(57) ABSTRACT

There is provided a socket compatibility layer for a TOE in a high quality server system. The socket compatibility layer for a TOE provides a standard socket API to an application program and provides binary-level compatibility so that a networking function of a TOE can be used without modifying the conventional socket application program thereby supporting simultaneous use of a TOE and a general Ethernet-based NIC. In a kernel structure of the Linux operation system, the socket compatibility layer for a TOE is located below a BSD socket layer receiving a socket system call from an application program through a standard socket API, is located above an INET socket layer and a TOE driver to control connection between an upper layer and a lower layer, and transmits the socket system call received from the BSD socket layer to the TOE driver or the INET socket layer according to call contents of the socket system call. The socket compatibility layer for a TOE includes a TOE socket generation module, a virtual TOE socket, a TOE STREAM module unit and a TOE DGRAM module unit.

14 Claims, 4 Drawing Sheets

U.S. PATENT DOCUMENTS

| | | | | |
|---|---|---|---|---|
| 2004/0049774 | A1* | 3/2004 | Boyd et al. | 719/312 |
| 2004/0088262 | A1* | 5/2004 | Boucher et al. | 705/65 |
| 2004/0117496 | A1* | 6/2004 | Mittal et al. | 709/230 |
| 2004/0243723 | A1* | 12/2004 | Davis et al. | 709/250 |
| 2004/0249957 | A1* | 12/2004 | Ekis et al. | 709/228 |
| 2005/0086349 | A1* | 4/2005 | Subramaniyan | 709/230 |
| 2005/0135361 | A1* | 6/2005 | Lim et al. | 370/389 |

OTHER PUBLICATIONS

"Improving Server Performance: How to improve your server's performance by offloading a TCP/IP stack from a linux-based server onto an iNIC" p. 1-8.*

Jin-Soo Kim, et al.; "SOVIA: A User-level Sockets Layer Over Virtual Interface Architecture"; Electronics and Telecommunications Research Institute; pp. 1-10.

Sunghoon Son, et al.; "SOA: A Socket Interface for TOEs"; Electronics and Telecommunications Research Institute; pp. 1-6.

Sunghoon Son, et al.; "SOP: A Socket Interface for TOEs"; Electronics and Telecommunications Research Institute; pp. 1-6.

Yeh et al.; "Introduction to TCP/IP Offload Engine (TOE)"; 10 GEA; Apr. 2002; 6 pages.

Intel; "Offload Sockets Framework and Sockets Direct Protocol High Level Design"; Intel Corporation; Jun. 2002; 53 pages.

Linux Kernel v2.4.18; Nov. 23, 2001-Feb. 26, 2002; 30 pages.

Beck et al.; "Linux Kernel Internals"; Network devices under Linux; pp. 226-247.

Bovet et al.; "Understanding the Linux Kernel"; I/O Ports to Process Management; pp. 606-632.

* cited by examiner

SOCKET COMPATIBILITY LAYER FOR TOE

BACKGROUND OF THE INVENTION

This application claims the priority of Korean Patent Application No. 2003-92523, filed on Dec. 17, 2003, in the Korean Intellectual Property Office, the disclosure of which is incorporated herein in its entirety by reference.

1. Field of the Invention

The present invention relates to a socket compatibility layer for TCP/IP offload engine ('TOE'), and more particularly to a socket compatibility layer for TOE which can support a simultaneous use of a TOE and Ethernet-based network interface card ('NIC') in a high quality server system using the TOE.

2. Description of the Related Art

Typically, a TCP/IP stack is processed by software in a central processing unit of a server. However, as a network is developed to a gigabit network, processing of a TCP/IP protocol imposes a heavy burden on the central processing unit. Therefore, the performance of other application programs processed in a host processor may be deteriorated.

A TOE is developed to solve the above problem and a TCP/IP protocol is processed by dedicated hardware. The dedicated hardware processing the TCP/IP protocol is used, so that the burden of a host processor can be reduced. Therefore, the performance of an application program can be improved.

FIG. 1 is a diagram showing a simple comparison of a case using a general NIC and a case using a TOE.

As compared with the case (left side) using the general NIC, in the case (right side) using the TOE, a TCP layer and an IP layer are embedded in hardware. That is, the protocols are processed by the hardware. When a server of high performance transmits/receives a large quantity of data to a network, load on a host processor can be reduced by using the TOE.

However, in order to the TOE in the prior art, a standard socket API cannot be used in an application program or an already created application program must be modified and recompiled.

FIG. 2 is a diagram showing a TOE support structure which does not support the conventional standard socket API.

Hereinafter, the conventional software structure for a TOE will be described. In FIG. 2, an application program 10 must use a TOE API 21 which is a special API for a TOE in order to use a networking function of a TOE 20. Further, an already created socket application program must be recreated and recompiled so as to use the TOE API 21.

Further, another software structure for a TOE may exist, in this case, in spite of providing a standard socket API 11 to an application program, binary-level compatibility is not provided. FIG. 3 shows such a case.

FIG. 3, a plurality of protocol family types exist below a BSD socket layer 30. Herein, one protocol family corresponding to TOE is added, which allows a user to access the TOE 20 using the standard socket API 11. Further, in order to use a networking function of the TOE 20, a system call must be performed by means of a protocol family identifier of a TOE. In such a case, the application program 10 may use the standard socket API 11, but the already created socket application program must be modified and recompiled with corresponding protocol family identifier. Therefore, this means that binary-level compatibility for the existing socket application program is not provided.

Accordingly, in order to use the TOE 20 more efficiently, it is necessary to provide binary-level compatibility so that an application can use the standard socket API 11 and an existing application program can be used without modification and recompilation.

Hereinafter, a main data structure relating to a socket in the conventional kernel will be briefly described. FIG. 4 is a diagram showing the main data structure relating to the socket in the conventional kernel.

In FIG. 4, the uppermost BSD socket layer 30 is a layer for providing a BSD socket interface to the application program 10 and an INET socket layer 40 managing communication of IP based protocols exists below the BSD socket layer 30. Further, a TCP layer 50 taking charge of a TCP and a UDP exists below the INET socket layer 40.

The BSD socket layer 30 includes a socket generation module head 31, a BSD socket 32 and a BSD module unit 33. The socket generation module head 31 is a connection point to a socket generation module generating a socket of a lower protocol stack, and the BSD socket 32 contains plural information, such as a state and a type of a socket and a socket-related file, which is necessary for a BSD layer. The BSD module unit 33 provides a socket interface to the application program 10 and calls a module of a lower layer.

Further, the INET socket layer 40 includes an INET socket generation module 41, an INET socket 42, an INET STREAM module unit 43 and an INET DGRAM module unit 44. The INET socket generation module 41 generates an INET socket. The INET socket 42 contains plural information, such as an IP address of a destination, a port number and a wait queue, which is necessary for an INET layer. The INET STREAM module unit 43 is a set of modules processing an operation for a SOCK_STREAM type socket and the INET DGRAM module unit 44 is a set of modules processing an operation for a SOCK_DGRAM type socket.

The TCP layer 50 includes a TCP module unit 51 which is a set of modules processing a TCP protocol and a UDP module unit 52 which is a set of modules processing a UDP protocol.

To solve the aforementioned problems occurring in using the conventional TOE, it is necessary to modify the data structure relating to the socket in the conventional kernel. In the present invention, a socket compatibility layer for a TOE is realized with only a kernel module without modifying the codes of the conventional kernel.

SUMMARY OF THE INVENTION

The present invention provides a socket compatibility layer for a TOE which can support a simultaneous use of a TOE and a general Ethernet-based NIC and can provide binary-level compatibility so that an application program can use the standard socket API and existing application program can use the networking function of a TOE without any modification.

The present invention provides a socket compatibility layer for a TOE capable of operating with only a kernel module without modifying the codes of the conventional kernel.

According to an aspect of the present invention, there is provided a socket compatibility layer for a TOE, which is located below a BSD socket layer receiving a socket system call from an application program through a standard socket API, which is located above an INET socket layer and a TOE driver to control connection between an upper layer and a lower layer, which transmits the socket system call received from the BSD socket layer to the TOE driver or the INET socket layer according to call contents of the socket system call.

According to the present invention, the socket compatibility layer for a TOE includes a TOE socket generation module, a virtual TOE socket, a TOE STREAM module unit and a TOE DGRAM module unit. The TOE socket generation module generates a virtual TOE socket, connects the virtual TOE socket to other associated data structures, and generates an actual TOE socket on a TOE through the TOE driver. The virtual TOE socket contains protocol stack information associated with the TOE socket and identification information of the TOE socket and manages the TOE. The TOE STREAM module unit includes modules for performing an operation for a SOCK_STREAM type socket, and the TOE DGRAM module unit includes modules for performing an operation for a SOCK_DGRAM type socket.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Definitions

Figure 1:
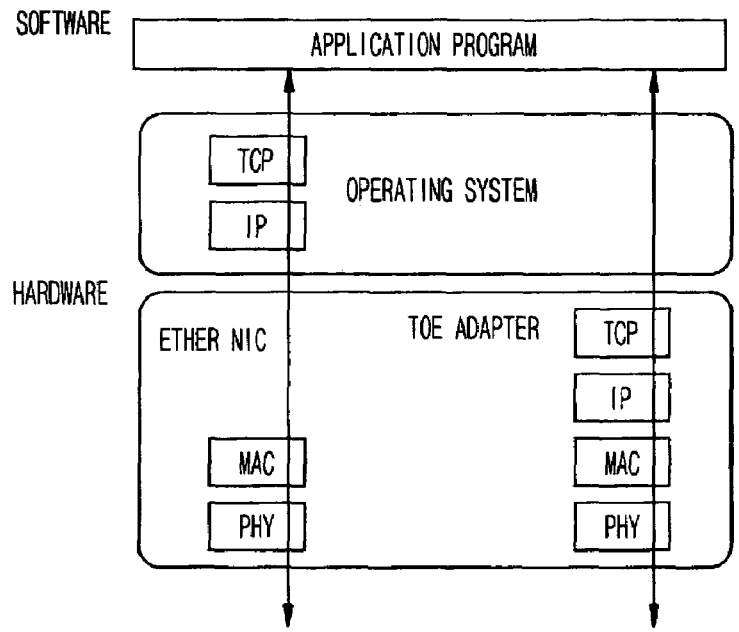
FIG. 1 is a diagram showing a simple comparison of a software layer structure in a case using a general NIC and a case using a TOE.
Figure 2:
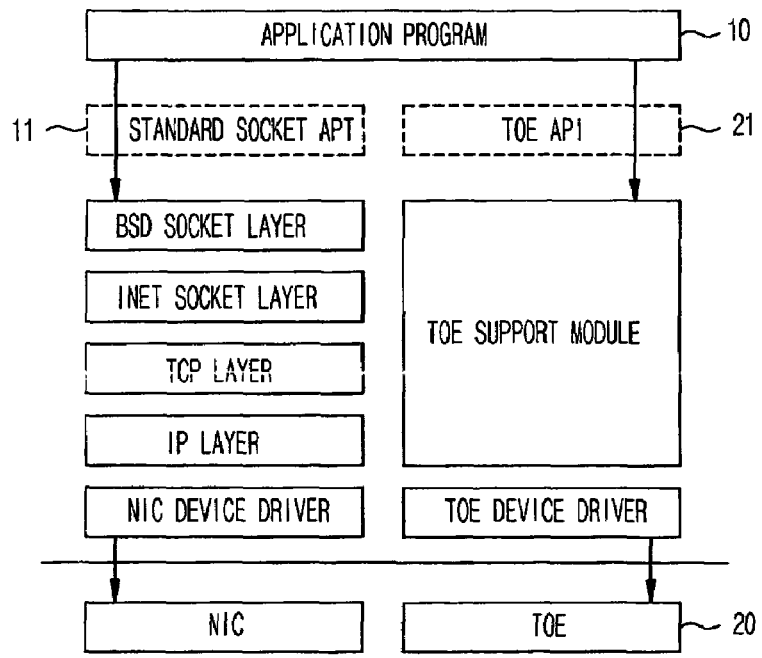
FIG. 2 is a diagram showing a TOE which does not support a standard socket API.
Figure 3:
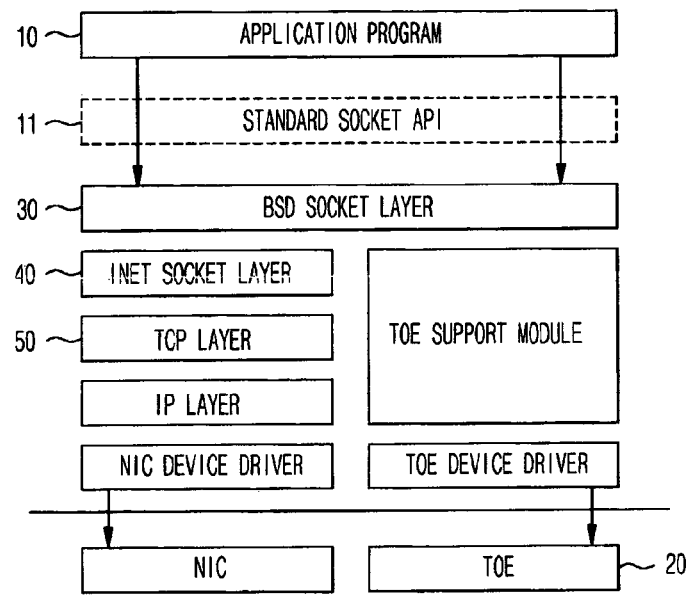
FIG. 3 is a diagram showing a TOE which supports a standard socket API but does not support binary-level compatibility.
Figure 4:
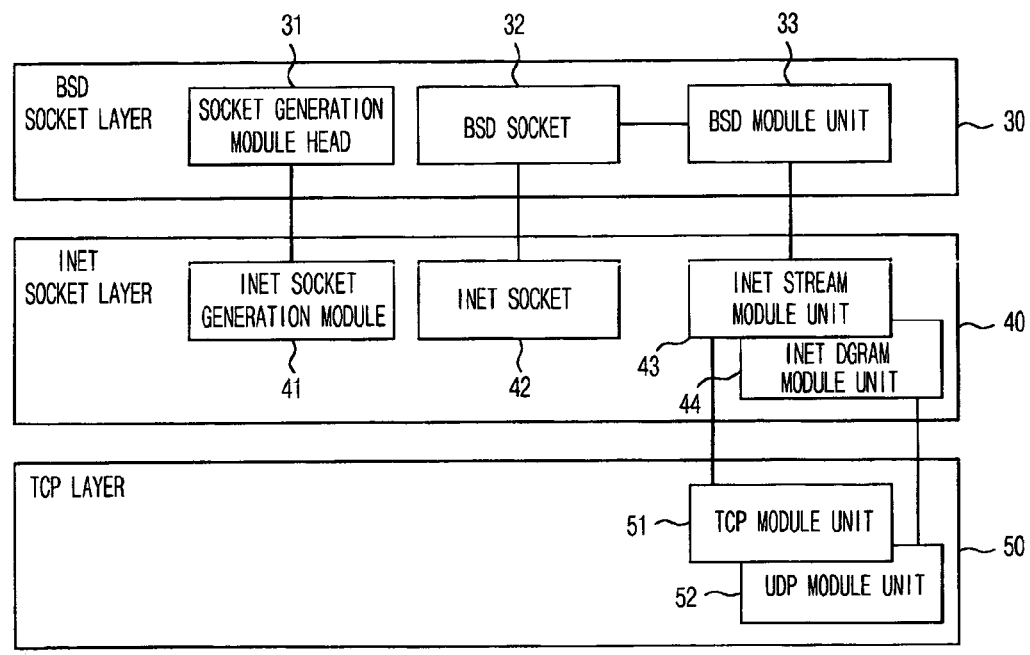
FIG. 4 is a diagram showing a main data structure relating to a socket in the conventional kernel.

The following terms/abbreviations have been widely used in the art and are used throughout the instant application for the sake of simplicity. The meanings of the terms/abbreviations as widely understood in the art are explained herein below.

| Abbreviation | Explanation | |
|---|---|---|
| TOE | TCP offload engine | TCP Offload Engine or TOE is a technology used in network interface cards to offload processing of the entire TCP/IP stack to the network controller |
| BSD socket | Berkeley (Berkeley Software Distribution) socket | The Berkeley sockets application programming interface (API) comprises a library for developing applications in the C programming language that perform inter-process communication, most commonly across a computer network. Berkeley sockets (also known as the BSD socket API) originated with the 4.2BSD Unix operating system (released in 1983) as an API. Only in 1989, however, could UC Berkeley release versions of its operating system and networking library free from the licensing constraints of AT&T's copyright-protected Unix. The Berkeley socket API forms the de facto standard abstraction for network sockets. Most other programming languages use an interface similar to the C API. |
| INET | | Network using IP. INET socket layer is layer managing communications of TCP or UDP protocol based on IP(Internet Protocol) network subsystem of computer management. |
| AF_INET | Address Family_INET | Address family for using INET network communications. Various kinds of protocol family under BSD socket layer are present, AF_INET is protocol family for INET network. For communicating INET newtwork in network program, socket of AF_INET address family should be generated. |
| SOCK_STREAM | Socket Stream | AF_INET address family sockets can be either connection-oriented (type SOCK_STREAM) or they can be connectionless (type SOCK_DGRAM). SOCK_STREAM and SOCK_DGRAM are types of socket. SOCK_STREAM is socket type showing connection-oriented way. |
| SOCK_DGRAM | Socket Data Gram | Socket type showing connectionless way |
| TCP/IP | Transmission Control Protocol/ Internet Protocol | Basic communication protocol of internet |
| UDP | User Datagram Protocol | Connectionless transport layer protocol in TCP/IP protocol stack |
| INET STREAM module unit | | Module unit (collection of modules) processing communication calculation on SOCK_STREAM type of socket in INET layer |
| INET DGRAM module unit | | Module unit (collection of modules) processing communication calculation on SOCK_DGRAM type of socket in INET layer |
| TOE STREAM module unit | | Module unit (collection of modules) processing communication calculation on SOCK_STREAM type of socket in socket compatible layer for TOE |
| TOE DGRAM module unit | | Module unit (collection of modules) processing communication calculation on SOCK_DGRAM type of socket in socket compatible layer for TOE |
| PS field | Protocol Stack field | Field recording what is protocol stack related to present socket among INET socket layer and TCP/IP protocol stacks of TOEs |

The present invention will now be described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. Like numbers refer to like elements throughout the specification.

Figure 5:
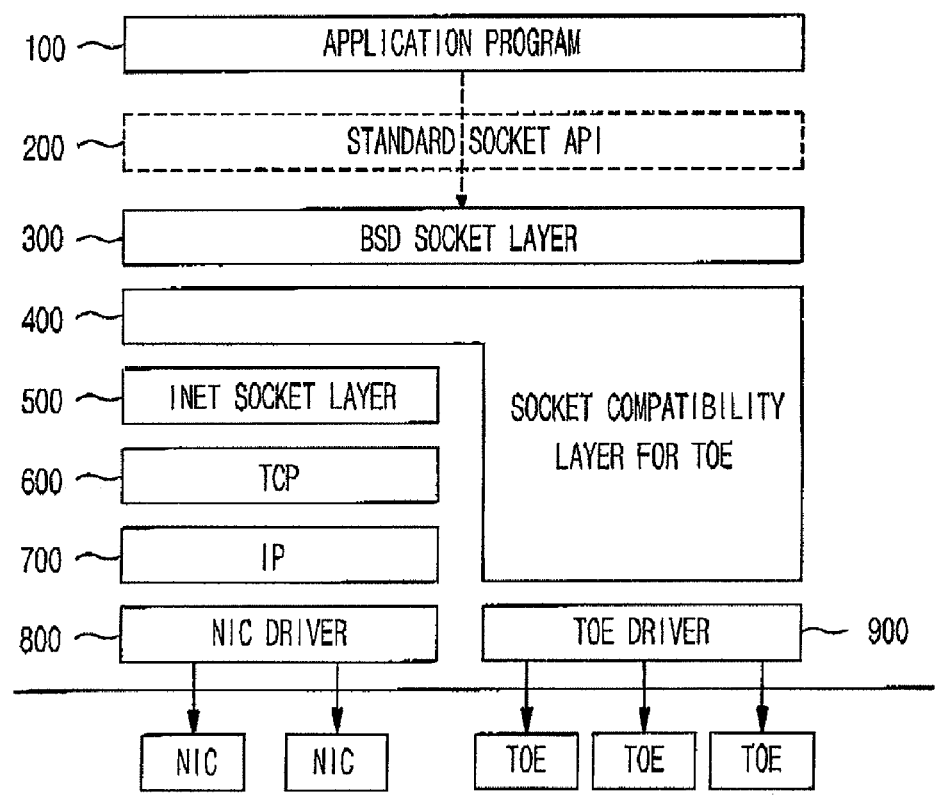
FIG. 5 is a diagram showing a software layer structure of a kernel including a socket compatibility layer for a TOE according to the present invention.

FIG. 5 is a diagram showing a software layer structure of a kernel including a socket compatibility layer for a TOE according to the present invention.

Referring to FIG. 5, in the software layer structure according to the present invention, the socket compatibility layer 400 for a TOE is located below a BSD socket layer 300 and above an INET socket layer 500 and a TOE driver 900. Further, a reference numeral 600 denotes a TCP layer, a reference numeral 700 denotes an IP layer and a reference numeral 800 denotes a NIC driver.

When an application program 100 requests a socket system call through a standard socket API 200, the BSD socket layer 300 receives the socket system call. When the received call is a call for an AF_INET protocol family socket, the BSD socket layer 300 sends the call to the socket compatibility layer 400 for a TOE.

Then, the socket compatibility layer 400 for a TOE determines whether to send the call to the INET socket layer 500 or the TOE driver 900 and sends the call to a proper side. In this way, the application program 100 can use a networking function of a TOE by means of the standard socket API 200 similarly to the conventional method. Further, the already created socket application program can be used without modification.

Figure 6:
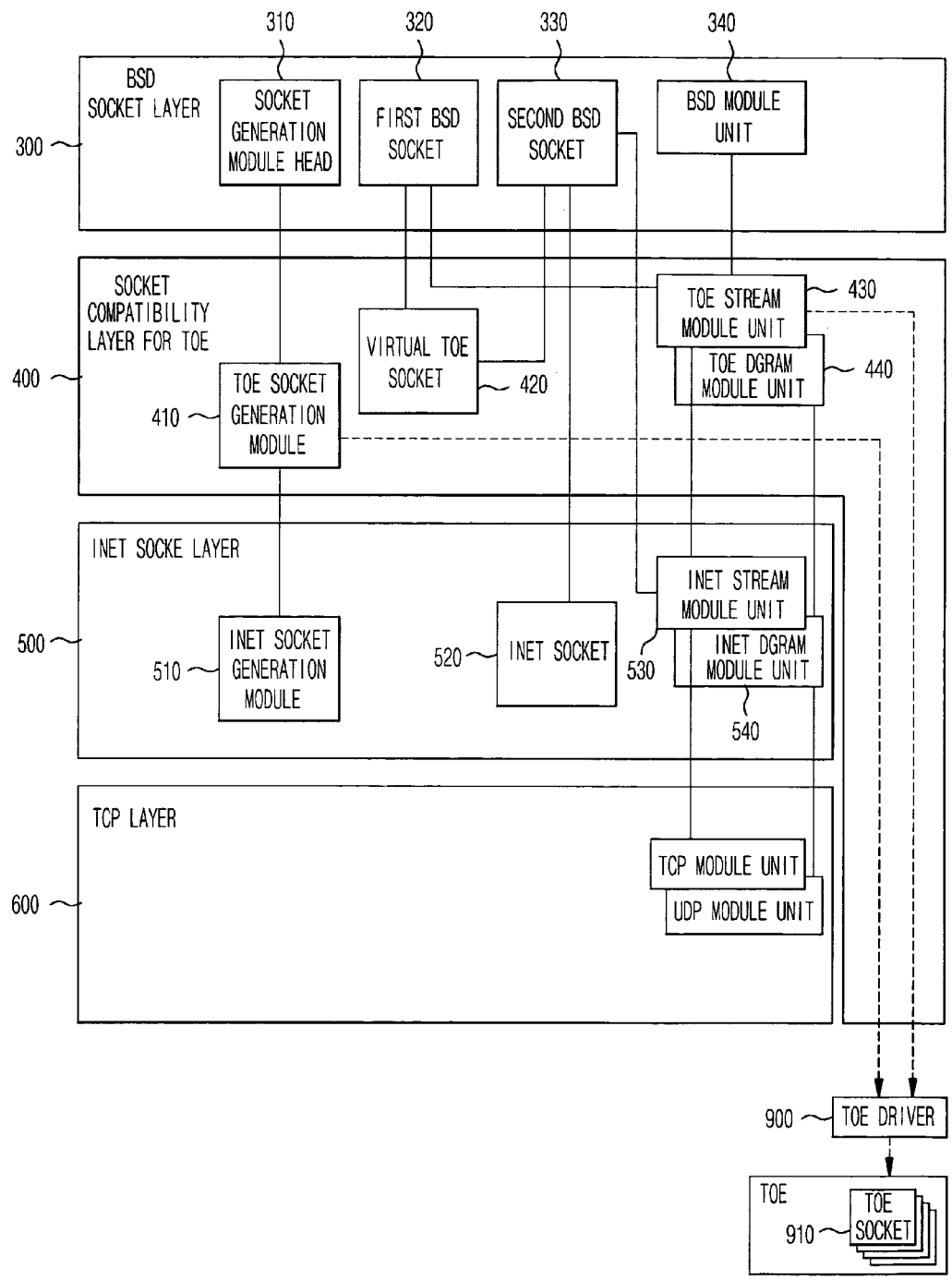
FIG. 6 is a diagram showing a main data structure relating to a socket in a kernel including the socket compatibility layer for a TOE according to the present invention.

Further, in the present invention, the socket compatibility layer 400 for a TOE is implemented with only a kernel module without modifying the codes of the conventional kernel. For this purpose, the socket compatibility layer 400 includes additional data structures. FIG. 6 is a diagram showing a data structure relating to a socket in a kernel including the socket compatibility layer 400 for a TOE according to the present invention.

Referring to FIG. 6, the socket compatibility layer 400 for a TOE includes a TOE socket generation module 410, a virtual TOE socket 420, a TOE STREAM module unit 430 and a TOE DGRAM module unit 440.

The TOE socket generation module 410 generates the virtual TOE socket 420, connects the virtual TOE socket to other associated data structures, sends an actual socket generation command to the TOE driver 900, and generates the TOE socket 410 on a TOE.

Also, the virtual TOE socket 420 is an extended type of an INET socket 520 and includes all information contained in the INET socket 520, a PS field and a socket identification field for recording identification for a TOE socket 910 existing in the TOE. The PS field records information indicating a TOE card or INET socket layer to which a current socket is associated. An actual socket used for a networking in the TOE is the TOE socket 910 and a socket used to manage the TOE socket in the socket compatibility layer is the virtual TOE socket 420.

Further, the TOE STREAM module unit 430 includes modules performing an operation for a SOCK_STREAM type socket. The module belonging to the TOE STREAM module unit 430 receives a system call of a user from a module belonging to a BSD module unit 340, determines a lower protocol stack to which the system call is to be sent, and sends the system call to a module belonging to a lower INET STREAM module unit 530 or the TOE driver 900.

The TOE DGRAM module unit 440 includes modules performing an operation for a SOCK_DGRAM type socket. The module belonging to the TOE DGRAM module unit 440 receives a system call of a user from the module belonging to the BSD module unit 340, determines a lower protocol stack to which the system call is to be sent, and sends the system call to a module belonging to a lower INET DGRAM module unit 540 or the TOE driver 900.

When the socket compatibility layer 400 for a TOE is initialized, a socket generation module head 310 belonging to the BSD socket layer 300 is connected to the TOE socket generation module 410. When a socket generation system call is requested from an application layer, the BSD socket layer 300 receives the system call and executes the TOE socket generation module 410 connected to the socket generation module head 310.

Thus, the TOE socket generation module 410 generates a first BSD socket 320, a second BSD socket 330, the virtual TOE socket 420 and the INET socket 520 by means of an INET socket generation module 510. Further, the TOE socket generation module 410 sends a command to the TOE driver 900 in order to generate the actual TOE socket 910 on the TOE.

When the TOE socket 910 is generated, identification information of the generated TOE socket is recorded in the socket identification field of the virtual TOE socket 420. Herein, the first BSD socket 320 and the virtual TOE socket 420 are associated with the TCP/IP protocol stack of the TOE, the second BSD socket 330 and the INET socket 520 are associated with the protocol stack of the INET socket layer. This two pairs of data structures are used until a protocol stack actually used in a connection and transmission/reception is determined. Then, one of the two pairs of data structures to be continuously used is determined when a system call such as bind, accept or connect is performed. Further, such information is recorded in the PS field of the virtual TOE socket 420. For example, when a system call "bind" is performed, a bind module belonging to the TOE STREAM module unit 430 or the TOE DGRAM module unit 440 receives the system call and inspects whether an IP address received as a parameter is an IP address assigned to a NIC or an IP address assigned to one of the toes. As a result of the inspection, when the IP address is the IP address of the NIC, the bind module sends the IP address to the bind module of the INET socket layer 500. In contrast, when the IP address is the IP address of the one of the TOE, the bind module sends the IP address to the TOE driver 900. Further, if the IP address received as the parameter has a value of 0 (INADDR_ANY), the bind module sends the IP address to all paths because this means that a specific IP address is not designated. Then, the bind module records the sending result in the PS field of the virtual TOE socket 420.

Then, when the application program 100 requests a socket-related system call such as send and recv, the system call is transferred to the lower layer through the module included in the BSD module unit 340. Herein, when a socket is a SOCK_STREAM type socket, the system call is transferred to the module belonging to the TOE STREAM module unit 430. In contrast, when the socket is a SOCK_DGRAM type socket, the system call is transferred to the module belonging to the TOE DGRAM module unit 440. The module having received the system call determines a lower stack to which the system call is to be transferred with reference to the contents of the PS field of the virtual TOE socket 420. According to a result of the determination, the module transfers the system call to the module belonging to the INET STREAM module unit 530, the module belonging to the INET DGRAM module unit 540 or the TOE driver 900.

A method by which the modules belonging to the TOE STREAM module unit 430 and the TOE DGRAM module unit 440 determine the lower stack to which the user's call is to be transferred can be slightly differently performed by each module. Further, those skilled in the art can perform various types of methods according to embodiments of the method.

The socket compatibility layer for a TOE and the data structure relating to the socket compatibility layer of the present invention as described above can be stored in a recording medium capable of being read by a computer. Such a computer readable medium includes all types of recording mediums storing programs and data capable of being read by a computer system. For instance, the computer readable medium includes a read only memory (ROM), a random access memory (RAM), a compact disk (CD)-ROM, a digital video disk (DVD)-ROM, a magnetic tape, a floppy disk, an optical data storage device, etc. Further, such computer readable mediums are distributed in computer systems connected through a network, and codes capable of being read by the computer are stored in the computer readable mediums and executed through a distribution scheme.

As described above, a socket compatibility layer for a TOE according to the present invention supports simultaneous use of a TOE and a general Ethernet-based NIC, provides a standard socket API in using a TOE in an application program, and provides binary-level compatibility so that a networking function of a TOE can be used without modifying or recompiling the already created application program using a socket, thereby enabling a high quality server to efficiently use the TOE, reducing overload on the server, and improving the performance of the application program.

Further, a socket interface of the present invention can be easily extended so as to support various types of toes and is realized with only a kernel module without modifying the codes of the conventional kernel, so that convenience in use the toes can be provided and stability of a system can be maintained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of providing binary-level compatibility so that an application program can use a standard socket API (application programming interface) and a networking function of a TOE (TCP offload engine) without any modification, said method comprising:

locating a socket compatibility layer for TOE below an upper layer which is a BSD (Berkeley Software Distribution) socket layer for receiving a socket system call from the application program through the standard socket API, and above a lower layer which includes an INET (Network using IP) socket layer and a TOE driver, in order to control connection between the upper layer and the lower layer, and transmitting, by the socket compatibility layer for TOE, the socket system call received from the BSD socket layer to either the TOE driver or the INET socket layer according to call contents of the socket system call.

2. The method of claim 1, wherein the socket system call is a call for an AF_NET (Address Family INET) protocol family socket between the upper layer and the lower layer.

3. The method of claim 1, wherein the socket compatibility layer for TOE includes a TOE socket generation module, a virtual TOE socket, a TOE STREAM (TOE stream) module unit and a TOE DGRAM (TOE data gram) module unit, said method further comprising:

the TOE socket generation module generating the virtual TOE socket, connecting the virtual TOE socket to other associated data structures, and generating an actual TOE socket on a TOE though the TOE driver, the virtual TOE socket including protocol stack information associated with the actual TOE socket and identification information of the actual TOE socket, and managing the TOE, the TOE STREAM module unit performing an operation for a SOCK_STREAM (Socket Stream) type socket, and the TOE DGRAM module unit performing an operation for a SOCK_DGRAM (Socket Data Gram type socket.

4. The method of claim 3, wherein the TOE socket generation module generates a first BSD socket and a second BSD socket in the upper, BSD socket layer, the virtual TOE socket, and an INET socket in the lower, INET socket layer, connects the first BSD socket to the virtual TOE socket, and connects the second BSD socket to the INET socket.

5. The method of claim 4, wherein the virtual TOE socket includes all information contained in the INET socket of the INET socket layer, a PS (Protocol Stack) field recording TCP/IP protocol stack information associated with each TOE socket, and a socket identification field recording identification information on the TOE socket.

6. The method of claim 3, wherein the TOE STREAM module unit receives the socket system call, which is a SOCK_STREAM type socket, from the BSD socket layer, determines a lower layer's protocol stack to which the socket system call is to be sent with reference to the virtual TOE socket, and sends the socket system call to either a corresponding module belonging to an INET STREAM (INET stream) module unit of the INET socket layer or the TOE driver according to the determination result.

7. The method of claim 3, wherein the TOE DGRAM module unit receives the socket system call, which is a SOCK_DGRAM type socket, from the BSD Socket layer, determines a lower layer's protocol stack to which the socket system call is to be sent with reference to the virtual TOE socket, and sends the socket system call to either a corresponding module belonging to an INET DGRAM (INET data gram) module unit of the INET socket layer or the TOE driver according to the determination result.

8. A computer readable medium storing therein a socket compatibility layer for TOE (TCP offload engine) for providing binary-level compatibility so that an application program can use a standard socket API (application programming interface) and a networking function of a TOE without any modification, wherein said socket compatibility layer for TOE is located below an upper layer which is a BSD (Berkeley Software Distribution) socket layer for receiving a socket system call from the application program though the standard socket API, and above a lower layer which includes an INET (Network using IP) socket layer and a TOE driver, in order to control connection between the upper layer and the lower layer, and said socket compatibility layer for TOE is arranged to transmit the socket system call received from the BSD socket layer to either the TOE driver or the INET socket layer according to call contents of the socket system call.

9. The medium of claim 8, wherein said socket compatibility layer for TOE is arranged to process the socket system call when the socket system call is a call for an AF_INET (Address Family INET) protocol family socket between the upper layer and the lower layer.

10. The medium of claim 8, wherein the socket compatibility layer for TOE includes a TOE socket generation module, a virtual TOE socket, a TOE STREAM (TOE stream) module unit and a TOE DGRAM (TOE data gram) module unit, the TOE socket generation module being arranged for generating the virtual TOE socket, Connecting the virtual TOE socket to other associated data structures, and generating an actual TOE socket on a TOE though the TOE driver, the virtual TOE socket including protocol stack information associated with the actual TOE socket and identification information of the actual TOE socket, and arranged for managing the TOE, the TOE STREAM module unit including modules for performing an operation for a SOCK_STREAM (Socket Stream) type socket, and the TOE DGRAM module unit including modules for performing an operation for a SOCK_DGRAM (Socket Data Gram) type socket.

11. The medium of claim 10, wherein the TOE socket generation module is arranged to generate a first BSD socket and a second BSD socket in the upper, BSD socket layer, the virtual TOE socket, and an INET socket in the lower, INET socket layer, connect the first BSD socket to the virtual TOE socket, and connect the second BSD socket to the INET socket.

12. The medium of claim 11, wherein the virtual TOE socket includes all information contained in the INET socket of the INET socket layer, a PS Protocol Stack field recording TCP/IP protocol stack information associated with each TOE socket, and a socket identification field recording identification information on the TOE socket.

13. The medium of claim 10, wherein the TOE STREAM module unit is arranged to receive the socket system call, which is a SOCK_STREAM type socket, from the BSD Socket layer, determine a lower layer's protocol stack to which the socket system call is to be sent with reference to the virtual TOE socket, and send the socket system call to either a corresponding module belonging to an WET STREAM (INET stream) module unit of the INET socket layer or the TOE driver according to the determination result.

14. The medium of claim 10, wherein the TOE DGRAM module unit is arranged to receive the socket system call, which is a SOCK_DGRAM type socket, from the BSD socket layer, determine a lower layer's protocol stack to which the socket system call is to be sent with reference to the virtual TOE socket, and send the socket system call to either a corresponding module belonging to an INET DGRAM (INET data gram) module unit of the INET socket layer or the TOE driver according to the determination result.

\* \* \* \* \*